(12) United States Patent
Xu

(10) Patent No.: US 7,889,719 B2
(45) Date of Patent: Feb. 15, 2011

(54) METHOD AND APPARATUS FOR COMMUNICATION CHANNEL SWITCH

(75) Inventor: Tian Xu, Shanghai (CN)

(73) Assignee: SAP AG, Walldorf (DE)

( * ) Notice: Subject to any disclaimer, the term of this patent is extended or adjusted under 35 U.S.C. 154(b) by 571 days.

(21) Appl. No.: 11/606,859

(22) Filed: Nov. 29, 2006

(65) Prior Publication Data

US 2008/0123587 A1 May 29, 2008

(51) Int. Cl.
| | |
|---|---|
| H04L 12/66 | (2006.01) |
| H04J 3/16 | (2006.01) |
| G06F 15/173 | (2006.01) |
| H04M 3/42 | (2006.01) |

(52) U.S. Cl. ................. 370/352; 370/437; 709/236; 379/211.02

(58) Field of Classification Search ............ 370/252, 370/351–356, 431, 437, 465; 379/211.02; 709/238
See application file for complete search history.

(56) References Cited

U.S. PATENT DOCUMENTS

| | | | | |
|---|---|---|---|---|
| 7,349,530 | B2* | 3/2008 | Griffiths | ........ 379/121.04 |
| 2004/0101121 | A1* | 5/2004 | D'Silva et al. | ........ 379/211.02 |
| 2004/0264427 | A1* | 12/2004 | Jaakkola et al. | ........ 370/338 |
| 2005/0286690 | A1* | 12/2005 | Thommana et al. | ........ 379/114.01 |
| 2007/0260635 | A1* | 11/2007 | Ramer et al. | ........ 707/104.1 |
| 2008/0043976 | A1* | 2/2008 | Maximo et al. | ........ 379/220.01 |
| 2008/0118052 | A1* | 5/2008 | Houmaidi et al. | ........ 379/265.11 |

* cited by examiner

*Primary Examiner*—Nittaya Juntima
(74) *Attorney, Agent, or Firm*—Mintz Levin Cohn Ferris Glovsky and Popeo, P.C.

(57) ABSTRACT

A method and an apparatus for selecting a communication channel according to usage patterns maintained in a database for multiple communication channels available to reach a recipient are described. Each communication channel is associated with at least two communication systems. Usage patterns of a communication channel are related to daily communication channel usage information including the corresponding business activities of the recipient. In responding to a request to reach the recipient, one communication channel of a communication service is selected according to the usage patterns retrieved from the database to establish a network communication with the recipient.

24 Claims, 7 Drawing Sheets

| | | 303 → | ← 301 |
|---|---|---|---|
| 305 → | INSTANT MESSAGE | INSTANT MESSAGE 1 | OFF |
| | | INSTANT MESSAGE 2 | ON |
| | | ... | ← 315 |
| 307 → | PHONE | PHONE NUMBER 1 | ON |
| | | PHONE NUMBER 2 | OFF |
| | | PHONE NUMBER 3 | OFF ← 317 |
| | | SIP ADDRESS | ON |
| | | ... | |
| 309 → | SMS | PHONE NUMBER 1 | ON |
| | | PHONE NUMBER 2 | OFF |
| | | ... | |
| 311 → | APPLICATION SHARING DEVICE | SIP ADDRESS | OFF |
| | | OTHERS.. | OFF |
| 313 → | EMAIL | EMAIL ADDRESS 1 | ON |
| | | EMAIL ADDRESS 2 | ON |
| | | ... | |
| | OTHER | SIP ADDRESS | OFF |

METHOD AND APPARATUS FOR COMMUNICATION CHANNEL SWITCH

FIELD OF INVENTION

The present invention relates generally to communications. More particularly, this invention relates to unified communications.

BACKGROUND

As the number of communication services increases, more and more business people are connected through multiple communication devices. It is possible to reach a business person through a telephone, a mobile phone, a message through IM (Instant Message), an email, or a message through SMS (Short Message System). Using multiple telephones and mobile phones for different places and time has become a common practice for a business person.

However, more and more business people have wasted time making and chasing calls to customers and colleagues because of lack of information how to choose the most efficient way to contact the target person. Often times, when there is a need to make an immediate and direct contact with a person, most business persons have to resort to a trial and error approach. However, only less than half of such attempts are successful.

In addition, each person has his/her own preferred ways to receive a message at different hours depending on current business activities engaged in. Usually, a business organization may impose constraints on whether a particular type of communication device is allowed during a specific business activity, such as a group meeting or a custom meeting. As a result, these factors further complicate how to choose a most productive communication service to reach a business person.

SUMMARY OF THE DESCRIPTION

The embodiment of the present invention includes a method and apparatus that select a communication channel according to usage patterns maintained in a database for multiple communication channels available to reach a recipient. Each communication channel is associated with at least two communication systems. Usage patterns of a communication channel are related to business activities of a recipient. In responding to a request to reach the recipient, one of the multiple communication channels is selected according to the usage patterns retrieved from the database to establish a network communication with the recipient.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 3 is a block diagram illustrating a set of example communication channels.

DETAILED DESCRIPTION

Figure 1:
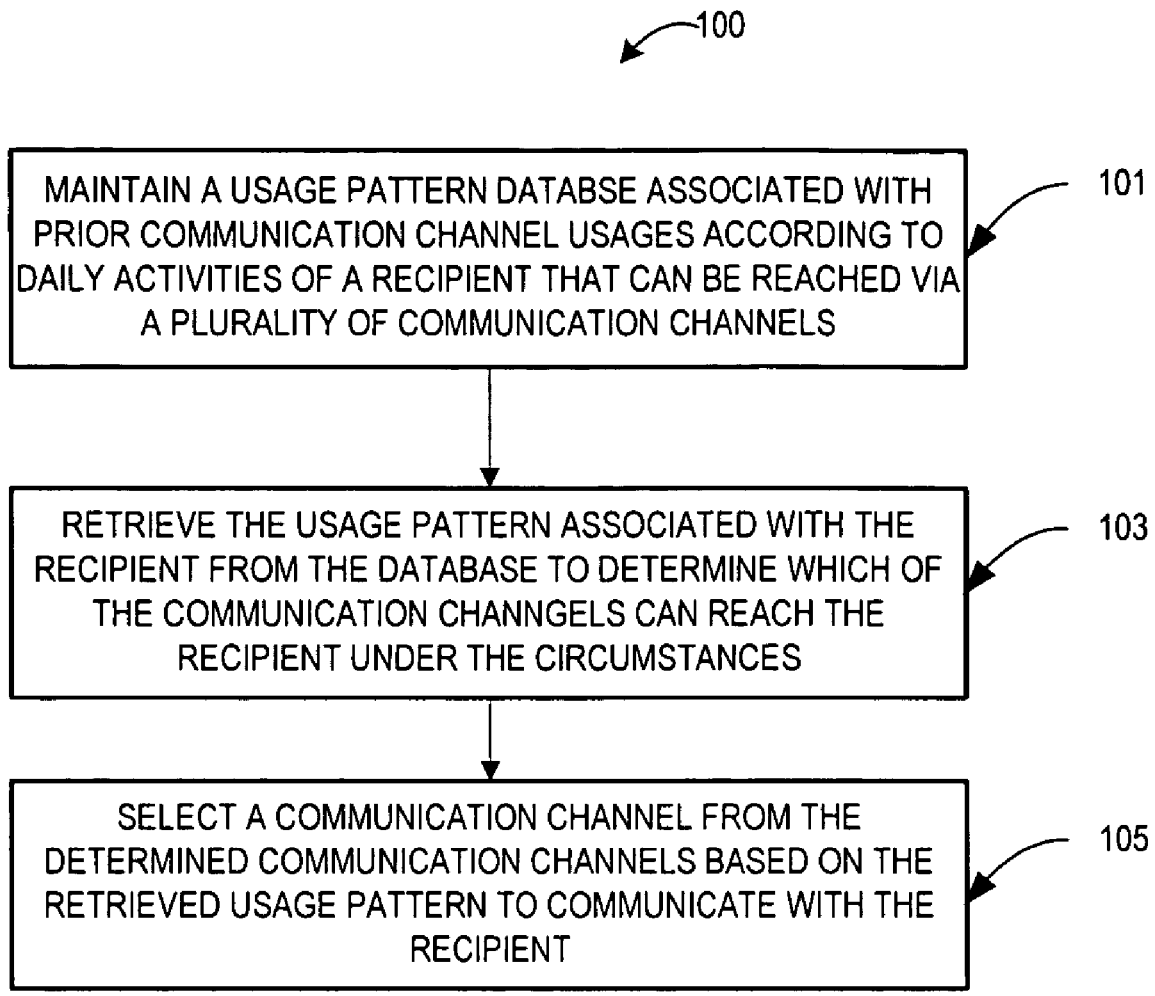
FIG. 1 is a flow diagram illustrating one embodiment of a process for selecting a communication channel.

A method and an apparatus for communication channel switch are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a communication channel switch may be designed to provide a communication service for selecting a communication channel based on the recipient's preferences and his/her current business presence status, such as in the meeting, on the phone, at home, or during traffic, etc. The communication service may detect available communication channels for the recipient and determine the most appropriate one available at the time a communication attempt is made. Therefore, the communication service may reduce or eliminate the need to send a message to the recipient by trial and error over some or all potential communication channels for the recipient.

For example, according to one embodiment, such a communication channel switch may be utilized in an enterprise business system when an alert or notification is generated from a Universal Work List out of Business Transaction Manager to reach a target recipient, whom may be contacted through multiple communication mechanisms, such as, for example, an email, an instant message, an short message, a mobile phone, a smart phone, or a desk phone, etc. The communication service may determine the recipient is currently commuting through traffic and dial the mobile phone to push the message to the recipient immediately. Note that throughout this application, for the illustration purposes, an enterprise business management system is used as an example to illustrate techniques of embodiments of the invention. However, it is not so limited. It will be appreciated that other management systems may also be applied.

FIG. 1 is a flow diagram illustrating one embodiment of a process for selecting a communication channel. For example, the process 100 may be performed by some components of system 200 of FIG. 2. In one embodiment, the process 100 includes, but is not limited to, maintaining a database of usage patterns to select a communication channel. In one embodiment, referring to FIG. 1, processing logic maintains a usage database to store daily communication channel usage information through the communication switch at block 101. A recipient may be associated with multiple communication channels, such as, for example, a mobile phone, a desk phone, an email account, a short message account, or a node in an application sharing service (such as NetMeeting for online conferencing), etc. In one embodiment, communication channel usage information includes the time and/or business activities associated with the corresponding recipient when a communication channel is selected. In one embodiment, processing logic retrieves usage patterns of communication channels from the usage pattern database at block 103. Based on the retrieved usage patterns among multiple communication channels associated with a recipient, processing logic selects a most appropriate communication channel to reach the recipient. Usually, depending on different day and time, different communication channels may be selected by processing logic for the same recipient.

Figure 2:
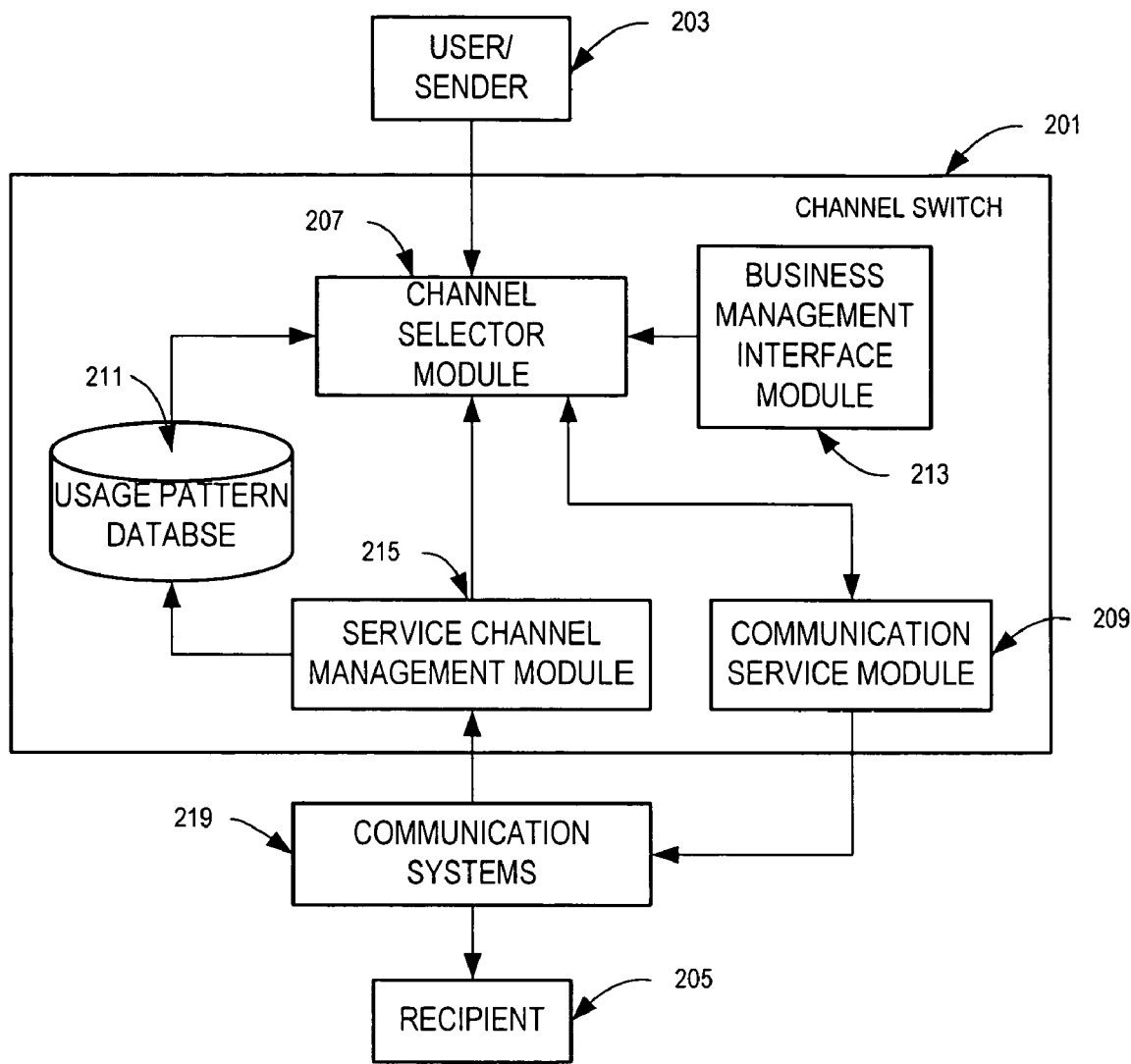
FIG. 2 is a block diagram illustrating one embodiment of a system for communication channel switch.

FIG. 2 is a block diagram illustrating one embodiment of a system for communication channel switch. In one embodiment, a channel switch 201 includes, but is not limited to, a database to maintain usage patterns for communication channels and a channel selector module to select a communication channel. In one embodiment, the channel switch 201 belongs to an EIS or ERP (Enterprise Resource Planning) system of an enterprise entity. In one embodiment, the channel switch 201 is based on a Business Presence Abstraction Framework of an SAP enterprise system. For example, referring to FIG. 2, the channel switch 201 establishes a communication channel between a sender 203 and a recipient 205. A sender 203 may be a business system user or an electronic device initiating a message. The message may be triggered by receiving an alert, a notification or other business related information. A message may be a voice message, a text message, an email or a multimedia message. A recipient 205 may be an end user targeted or another electronic device capable of receiving a message. When receiving a request to communicate with the recipient 205, according to one embodiment, the channel selector module 207 identifies a set of potential communication channels for the target recipient 205 from the communication service module 209.

The channel selector module 207, according to one embodiment, retrieves usage patterns for each potential communication channel from the usage pattern database 211. In one embodiment, the usage pattern database 211 stores prior histories of usage information of communication channels. In one embodiment, a channel selector module 207 obtains a business scenario for the recipient from a business management interface module 213. Additionally, the channel selector module 207 may receive configuration settings from a service channel management module 215. Configuration settings may include personal preferences and/or requirements from business organizations. In one embodiment, a channel selector module 207 determines a most appropriate communication channel available to reach the target recipient according to usage patterns, business scenarios and/or configuration settings. In one embodiment, a communication connection is established through a communication service module 209 to a communication system 219 coupling the sender 203 and the recipient 205 according to the selected communication channel. The service channel management module 215 may record communication channel usage information received from a communication system 219 into the usage pattern database 211. In one embodiment, a channel switch 201 belongs to an ERP system. In another embodiment, a channel switch 201 belongs to an EIS system.

In one embodiment, the business management interface module 213 provides business activity information associated with the recipient by interacting with business management systems, such as Outlook from Microsoft, Gmail Calendar, Lotus Notes, calendar systems, or other enterprise management systems. Business activity information may include business calendar, address books, or other business calendars. The channel selector module 207 may derive current business scenarios associated with the recipient from the retrieved business activity information. A business scenario may include information related to the recipient about scheduled business activities, current business activities, business roles associated with the business activities, expected activity durations, and/or activity locations, etc. Business activities may be meetings, commuting, office work, lunch/rest or vacationing. A business role may be predefined, for example, under Master Data Organization Model of SAP, as a sales person, a financial accountant, a purchase buyer, or a service engineer etc. A business location may be an international country, at a office, a meeting room, a conference room, a building, a city, or the home.

FIG. 3 is a block diagram illustrating a set of example communication channels. In one embodiment, each communication channel is associated with a service type, a channel identification and a status indicating availability of the respective communication channel. A value of a channel status may be "on" or "off". For example, a service type of an instant message 305 has a channel identified as Instant Message 1 303 having an "off" status. Instant Message 1 303 may include an addressable account name in the instant message service 305. A communication channel with an "off" status indicates the communication channel is currently not available, such as when a user turns off a corresponding communication device for an instant message account. In one embodiment, services used to establish communication channels include, but is not limited to, telephone service 307, SMS (Short Message Service) 309, application sharing service 311 (such as NetMeeting for online conferencing), and email services 313. A telephone communication may be identified by a phone number 315 or an SIP (Session Initiation Protocol) address 317, where an IP phone may employ an SIP address. Searching for an available phone under PSTN (Public Switch Telephone Network) or non-IP based PBX (Private Branch Exchange) may be based on an mature computer and telephony integration application.

Figure 4:
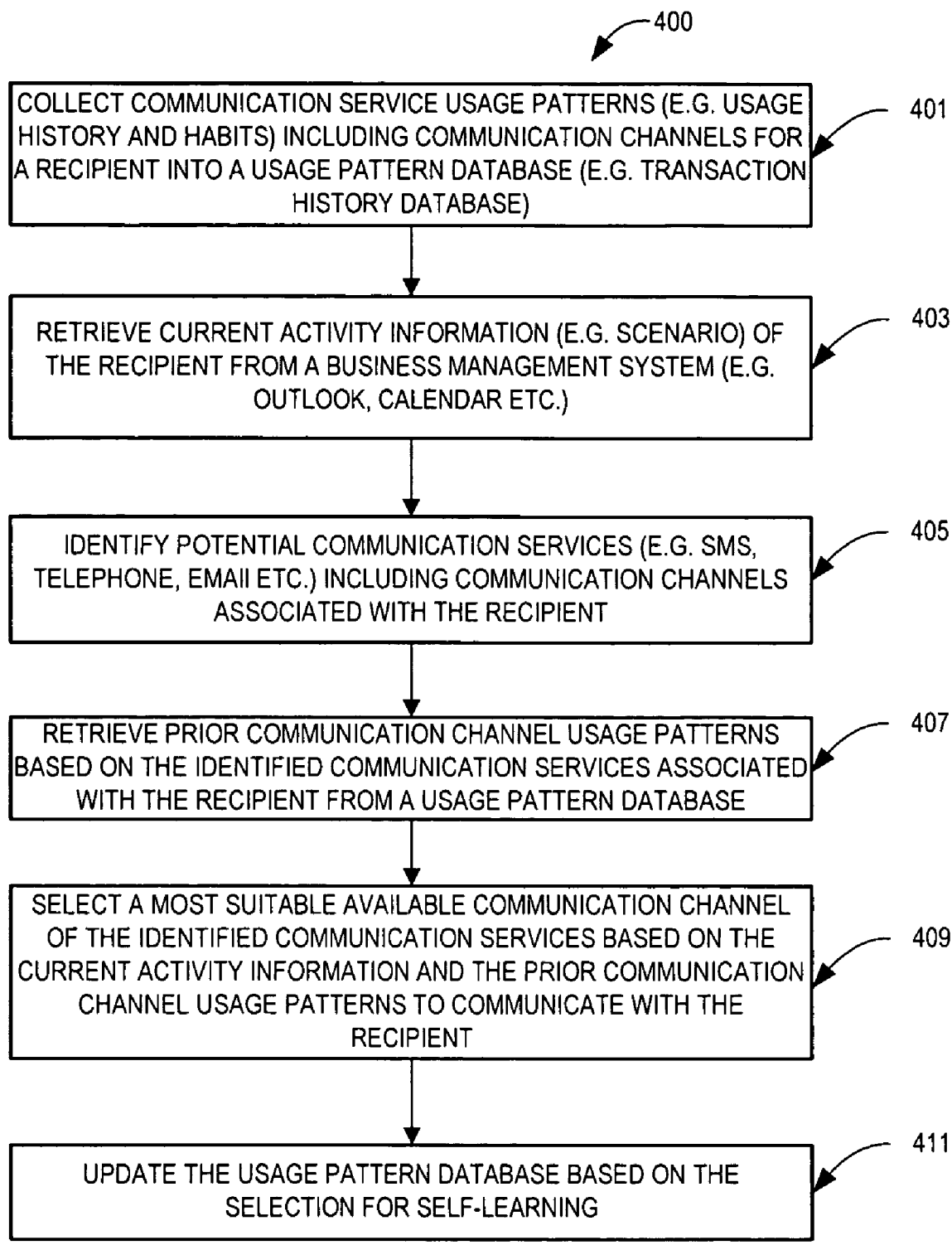
FIG. 4 is a flow diagram illustrating another embodiment of a process for selecting a communication channel.

FIG. 4 is a flow diagram illustrating another embodiment of a process for selecting a communication channel. In one embodiment, the process 400 collects communication service usage patterns for a user over a period of time at block 401. A communication service may be associated with one or more communication channels, e.g. a telephony communication service may include a home phone channel and an office phone channel. A usage pattern may include histories of usage records and usage habits derived herewith. A usage record may include which communication service is used, when a communication service is used, the usage duration, the associated business scenario, and the corresponding transaction for a caller or a recipient. When establishing a communication service to reach a target recipient, at block 403, according to one embodiment, the processing logic retrieves information about current business activities, such as business scenario, for the target recipient from a business management system. The processing logic may also identify all available communication services associated with the target recipient at block 405. Available communication services may be a subset of all potential communication services associated with a recipient. A communication channel associated with an available communication service may be an available communication channel to reach the recipient. The identification may be based on the current business activities associated with the recipient as retrieved at block 403. The processing logic may detect one potential communication service is currently unavailable to reach the target recipient at block 405.

At block 407, according to one embodiment, the processing logic retrieves prior communication usage patterns associated with the target recipient from the usage pattern database based on the identified communication services. In one embodiment, the processing logic selects a most suitable communication channel from all communication channels currently available for the target recipient at block 409. In one embodiment, the determination is based on the prior communication usage patterns associated with the recipient as obtained at block 407. At block 411, according to one embodiment, the processing logic updates the usage pattern database with usage records about the current selection.

Figure 5:
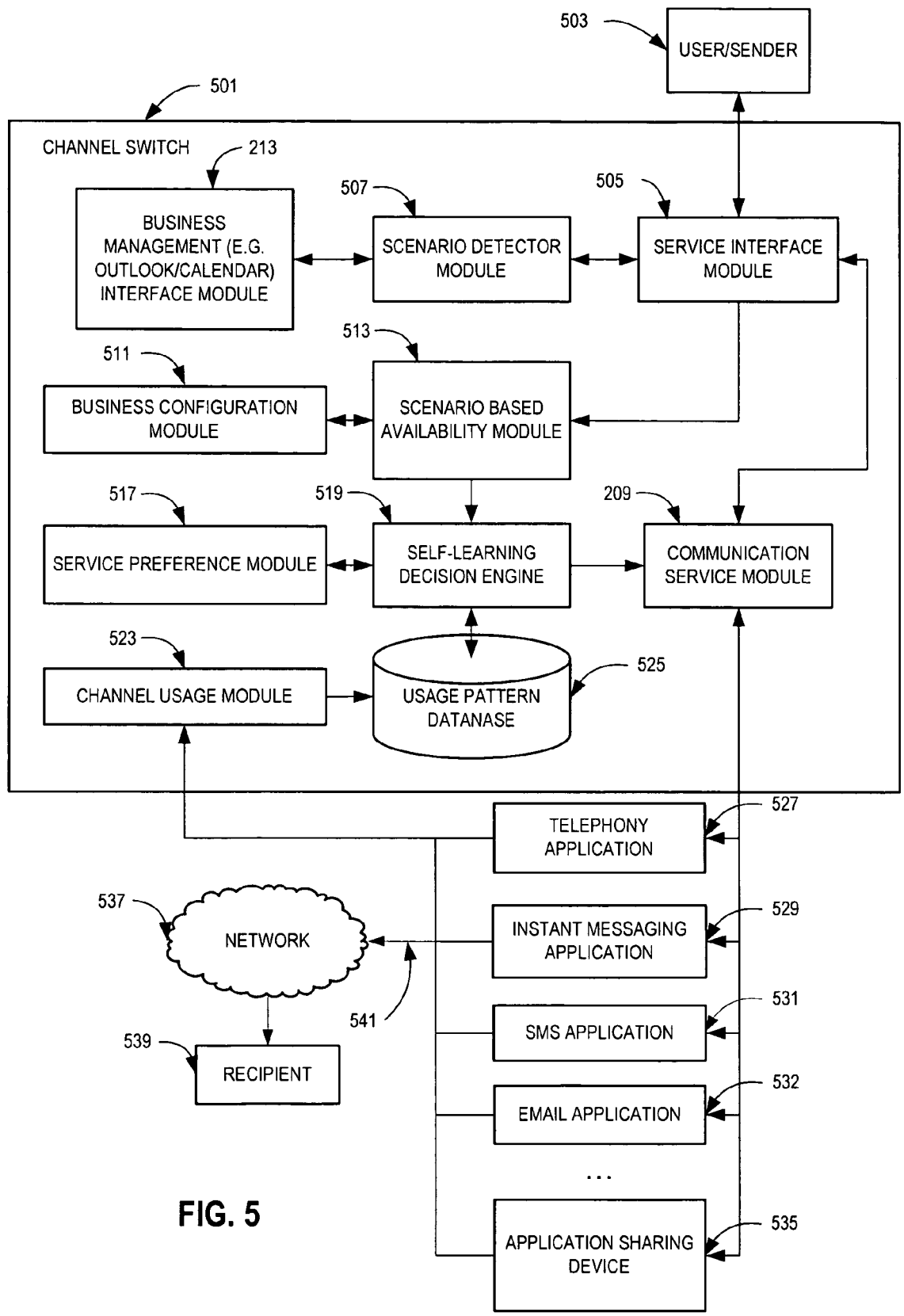
FIG. 5 is a block diagram illustrating one embodiment of system components for selecting a communication channel.

FIG. 5 is a block diagram illustrating one embodiment of system components for selecting a communication channel. In one embodiment, a channel switch 501 belongs to an EIS or ERP system of an enterprise entity. When a sender 503 establishes a communication channel 541 to reach a recipient 539 through the channel switch 501, according to one embodiment, a service interface module 505 receives a request from the sender 503. The service interface module 505 may provide a user interface for the sender 503 to input identification information such as the name or a selection from multiple preset users to identify the target recipient. In one embodiment, the service interface module 505 forwards information about the target recipient to a scenario detector module 507. In one embodiment, the scenario detector module 507 retrieves business activity information associated with the target recipient from the business interface module 213. In one embodiment, the scenario detector module 507 derives current business scenarios for the target recipient based on the business activity information retrieved, which may be obtained via an EIS (Enterprise Information System) of an enterprise entity. The scenario detector module 507 may anticipate an imminent change of current business scenario based on a scheduled duration of a business activity associated with the target recipient. In one embodiment, the service interface module 505 identifies some or all potential communication channels for the target recipient from the communication service module 209. Each potential communication channel identified may by registered by the target recipient as a communication channel through which the target recipient could be reached. Alternatively, a potential communication channel may be recorded or captured based on a prior use by the target recipient. The service interface module 505, according to one embodiment, detects the status of each potential communication channel through the communication service module 209. The status of a communication channel may be either on or off. A communication channel having a status "on" is available to reach the target recipient at the time of detection. The detection may be based on detecting an SIP address and/or translating phone connection signals from PSTN or PBX telephony SIP addresses. In one embodiment, the service interface module 505 forwards both current business scenarios and currently available communication channels for the target recipient to a scenario based availability module 513.

According to one embodiment, the scenario based availability module 513 receives organization wide configuration settings from a business configuration module 511. Organization wide configuration settings may limit the use of certain communication services for members of a business organization based on current business scenarios. For example, organization wide configuration settings may prescribe that no mobile phones are allowed during business meetings, a call from a particular customer should be allowed to overwrite conflicting personal preferences in using certain communication channels, or IM service or application sharing between an internal and an external staff should be turned off to avoid leaking sensitive company data. In one embodiment, the business configuration module 511 provides an interface for organization personnel to input configuration settings. In one embodiment, the scenario based availability module 513 filters out an available communication channel for the target recipient based on current business scenarios associated with the target recipient and organization wide configuration settings associated with the business organization the target recipient belongs to.

In one embodiment, a self-learning decision engine 519 receives filtered available communication channels and current business scenarios from the scenario based availability module 513. In one embodiment, the self-learning decision engine 519 retrieves communication channel usage patterns associated with the target recipient from a usage pattern database 525. In one embodiment, the self-learning decision engine 519 retrieves personal preferences in using communication services for the target recipient from a service preference module 517. Personal preferences may include a preferred phone number to dial during business hours, a preferred time to call during morning hours, a preferred email account to send a message, a group of contact persons allowed for a specific communication channel, directing all incoming calls to a mobile phone during commuting time, or redirecting all emails and/or instant messages to a mobile phone through SMS service during a business trip, etc.

In one embodiment, the service preference module 517 may provide an interface for a user to update personal preferences in using communication services. The self-learning decision engine 519, according to one embodiment, determines a most appropriate communication channel to select from available communication channels filtered by the scenario based availability module 513 based on current business scenarios, personal preferences, and communication usage patterns associated with the target recipient. In one embodiment, factors considered by the self-learning decision engine 519 in selecting a communication channel includes, but is not limited to, prior selections made by the self-learning decision engine 519, triggers to the channel switch, the frequency of using a certain communication channel for a particular business scenario, the communication channel used last time in the same or similar business scenario, and/or the communication channel used with the same sender. A trigger to the channel switch may be a message from a superior of the target recipient. A trigger may entail a final decision to select a communication channel as well as subsequent actions to implement the decision. In one embodiment, the higher the frequency or the more recently a particular communication channel was used by the target recipient, the higher the likelihood the particular communication channel will be selected to reach the target recipient. In one embodiment, the usage pattern database 525 is updated with the selection made by the self-learning decision engine 519.

The communication service module 209, according to one embodiment, establishes a network connection to reach the recipient 539 through a network 537 according to the selected communication channel received from the self-learning decision engine 519. The communication service module 209 may interact with communication systems setting up the network connection with a communication service application associated with the selected communication channel. The communication service application may be a telephony application 527, an instant messaging application 529, an SMS application 531, an email application 532 or an application sharing service, such as online conferencing 535.

In one embodiment, communication service applications send communication channel usage information to a channel usage module 523. The channel usage module 523 may receive communication channel usage information about a communication channel established by communication setup mechanisms other than the channel switch 501. A telephone service provider may forward telephone usage information about a telephone call to the channel usage module 523 when the telephone call is established. In one embodiment, the channel usage module 523 updates the usage pattern database 525 with received communication channel usage information.

Figure 6:
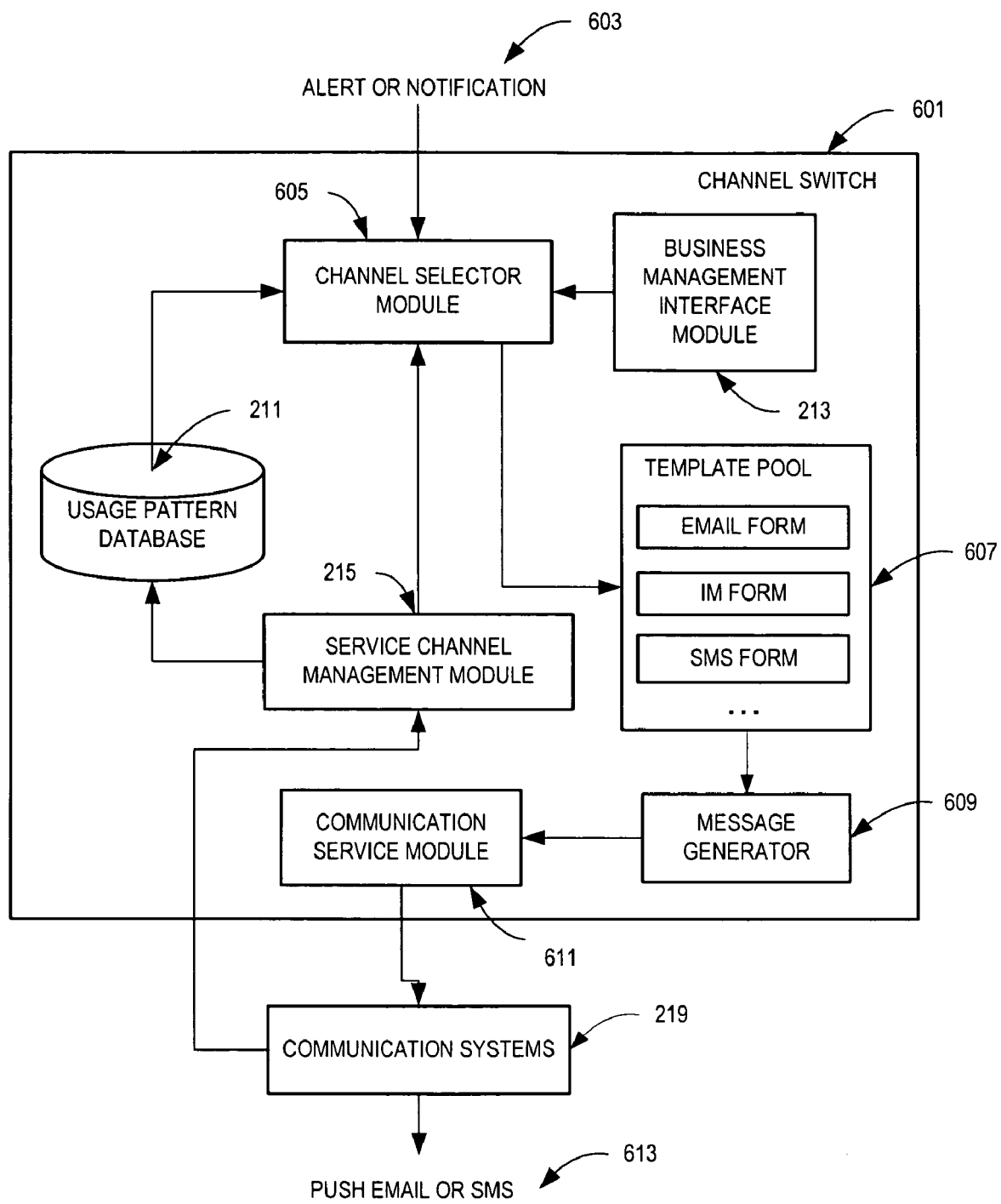
FIG. 6 is a block diagram illustrating another embodiment of system components for selecting a communication channel.

FIG. 6 is a block diagram illustrating another embodiment of system components for selecting a communication channel. In one embodiment, a channel switch 601 belongs to an EIS or ERP system of an enterprise entity. In one embodiment, the channel switch 601 pushes an alert or notification message 603 received as an email or SMS message 613. In one embodiment, a channel selector module 605 selects a communication channel according to usage patterns from the usage pattern database 211 and the service channel management module 215, similar to the channel selector module 207 of FIG. 2. Additionally, the channel selector module 605 may forward the selected communication channel and the message (such as the alert or notification message) content to a template pool 607.

In one embodiment, the template pool 607 maintains a set of message templates for communication services, including email, IM (instant messaging) and SMS. The template pool 607 may include A1S Form Template Pool from an SAP enterprise system. A message template may be a properly formatted form for the associated communication service. For example, a message template may be an email form including required email headers, fields and applicable values to be filled out with message content. Each service may be associated with at least one message template. In one embodiment, the template pool 607 selects a message template according to a selected communication channel and forwards the message to a message generator 609. In one embodiment, the message generator 609 generates a complete message based on the received message template along with the message content, such as the content of an alert or notification 603. The message generator 609 may fill out the message form associated with the received message template. In one embodiment, the message generator 609 forwards a generated email or SMS message to the communication service module 611, which includes similar functionalities of the communication service module 209 of FIG. 2, to push the generated message out to a recipient. In one embodiment, message templates may be provided as part of inputs when configuring an ERP system such as an SAP system.

Figure 7:
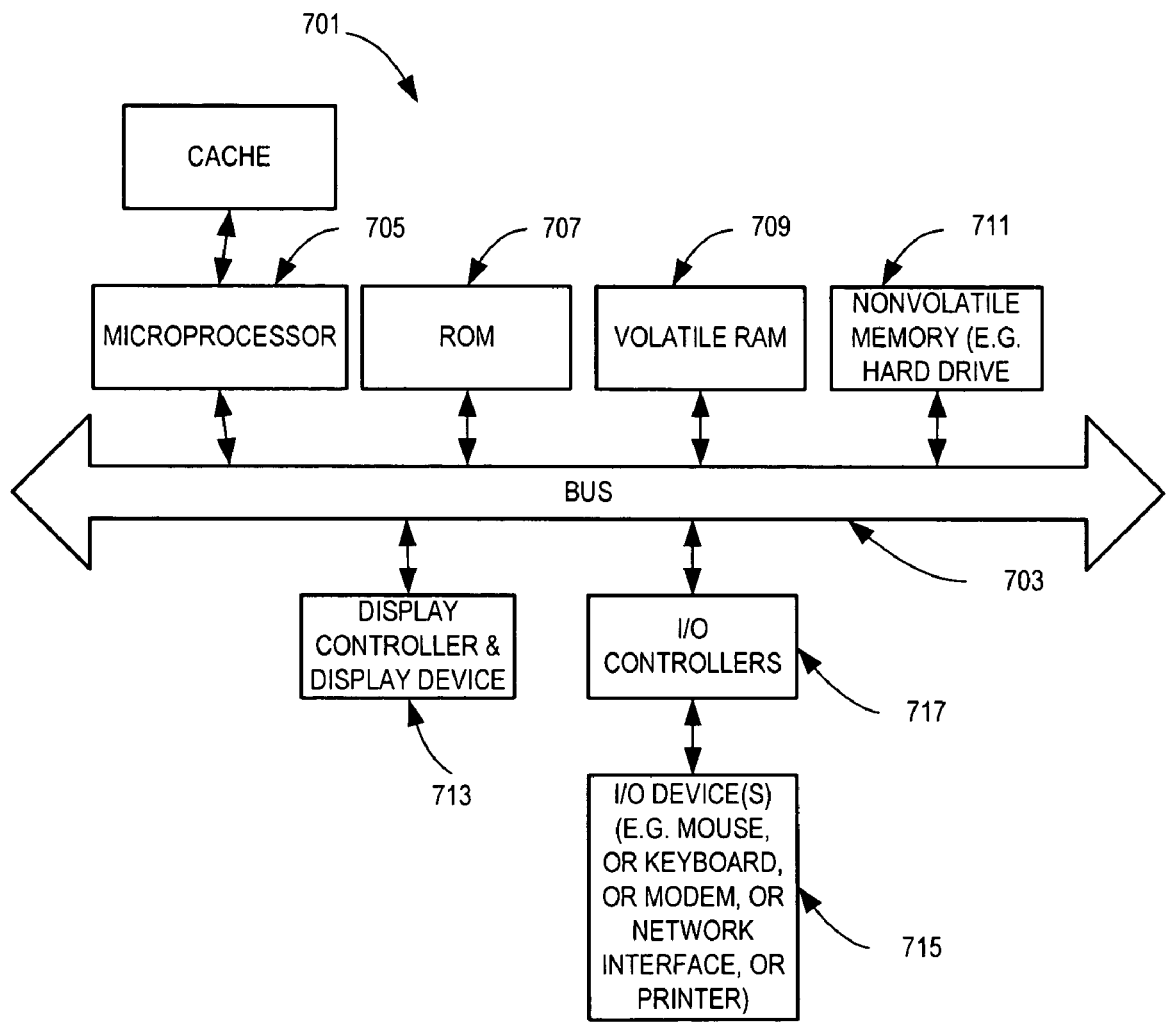
FIG. 7 illustrates one example of a computer system which may be used with one embodiment the present invention.

FIG. 7 shows one example of a computer system which may be used with one embodiment the present invention. For example, the system 700 may be implemented as a part of the systems shown in FIGS. 2, 5 and 6. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 701, which is a form of a data processing system, includes a bus 703 which is coupled to a microprocessor(s) 705 and a ROM (Read Only Memory) 707 and volatile RAM 709 and a non-volatile memory 711. The microprocessor 703 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., SAP Netweaver, Microsoft Corporation's NET, Mono, Java, Visual Composer, ABAP Workbench, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method, comprising:
   maintaining, by at least one processor-based device, database of usage patterns of a plurality of communication channels associated with a recipient, the plurality of communication channels being associated with at least two communication systems, and the usage patterns being associated with at least prior activities of the recipient, the prior activities including histories of usage information of the plurality of communication channels by the recipient;
   determining a set of available communication channels from the plurality of communication channels based on detected status of each of the plurality of communication channels, wherein the status indicating availability of the respective communication channels; and
   selecting from the set of available communication channels, by a channel switch, a communication channel according to at least one of the usage patterns associated with the at least prior activities of the recipient including the histories of usage information retrieved from the database, a business scenario, and configuration settings, in order to reach the recipient in view of current activities of the recipient, wherein the channel switch is implemented in at least one processor configured to provide one of an enterprise information system and an enterprise resource planning system.

2. The method of claim 1, further comprising:
   identifying a communication service associated with the recipient, wherein the set of available communication channels are based on the communication service.

3. The method of claim 1, further comprising:
   collecting the usage patterns associated with the recipient from the at least two communication systems; and
   querying information about the current activities of the recipient from one of an enterprise information system and an enterprise resource planning system having information regarding a relationship with the recipient.

4. The method of claim 3, wherein selecting a communication channel comprises:
   determining a first set of communication channels from the plurality of communication channels based on the organization;
   extracting a second set of communication channels from the first set of communication channels based on preferences of the recipient; and
   selecting the communication channel from the second set of communication channels according to the current activities and the usage patterns.

5. The method of claim 1, further comprising:
   updating the usage patterns in the database according to the selection, the updated usage patterns including information of the current activities.

6. The method of claim 5, wherein the updated usage patterns include trigger patterns derived from the information of the current activities.

7. A non-transitory machine-readable storage medium having instructions therein, which when executed by a machine, causes the machine to perform a method, the method comprising:
   maintaining in a database of usage patterns of a plurality of communication channels associated with a recipient, the plurality of communication channels being associated with at least two communication systems, and the usage patterns being associated with at least prior activities of the recipient, the prior activities including histories of usage information of the plurality of communication channels by the recipient;
   determining a set of available communication channels from the plurality of communication channels based on detected status of each of the plurality of communication channels, wherein the status indicating availability of the respective communication channels; and
   selecting from the set of available communication channels, by a channel switch, a communication channel according to at least one of the usage patterns associated with the at least prior activities of the recipient including the histories of usage information retrieved from the database, a business scenario, and configuration settings, in order to reach the recipient in view of current activities of the recipient, wherein the channel switch is implemented in one of an enterprise information system and an enterprise resource planning system.

8. The machine-readable storage medium of claim 7, wherein the determining comprises:
   identifying a communication service associated with the recipient based on the current activities, the communication service including the set of available communication channels.

9. The machine-readable storage medium of claim 7, further comprising:
   collecting the usage patterns associated with the recipient from the at least two communication systems; and
   querying information about the current activities of the recipient from one of an enterprise information system and an enterprise resource planning system having information regarding a relationship with the recipient.

10. The machine-readable storage medium of claim 9, wherein selecting a communication channel comprises:
    determining a first set of communication channels from the plurality of communication channels based on the organization;
    extracting a second set of communication channel from the first set of communication channels based on preferences of the recipient; and
    selecting the communication channel from the second set of communication channels according to the current activities and the usage patterns.

11. The machine-readable storage medium of claim 7, further comprising:
    updating the usage patterns in the database according to the selection, the updated usage patterns including information of the current activities.

12. The machine-readable storage medium of claim 11, wherein the updated usage patterns include trigger patterns derived from the information of the current activities.

13. A system, comprising:
    a usage pattern database to maintain usage patterns of a plurality of communication channels associated with a recipient, the plurality of communication channels being associated with at least two communication systems, and the usage patterns being associated with at least prior activities of the recipient, the prior activities including histories of usage information of the plurality of communication channels by the recipient; and
    a channel selector module to determine a set of available communication channels from the plurality of communication channels based on detected status of each of the plurality of communication channels, wherein the status indicating availability of the respective communication channels;
    wherein the channel selector module is further configured to select from the set of available communication channels a communication channel according to at least one of the usage patterns associated with the at least prior activities of the recipient including the histories of usage information retrieved from the usage pattern database, a business scenario, and configuration settings, in order to reach the recipient in view of current activities of the recipient, wherein the channel selector module is implemented in one of an enterprise information system and an enterprise resource planning system.

14. The system of claim 13, wherein the channel selector module comprises:
    scenario detector module to determine the current activities of the recipient based on a schedule associated with the recipient from an enterprise information system of an organization having a relationship with the recipient.

15. The system of claim 14, wherein the channel selector module further comprising:
    scenario based availability module to filter an available communication channel based on the current activities of the recipient and configuration settings associated with the organization.

16. The system of claim 15, wherein the channel selector module further comprises:
    decision engine to select the communication channel based on a preference of the recipient.

17. The system of claim 16, wherein the decision engine updates the usage pattern database with a selection made by the decision engine.

18. The system of claim 13, further comprising:
    a user interface module to receive business configuration and personal preferences settings from a user.

19. A method, comprising:
    maintaining, by at least one processor-based device, database of usage patterns of a plurality of communication channels associated with a recipient, the plurality of communication channels being associated with at least two communication systems, and the usage patterns being associated with at least prior activities of the recipient, the prior activities including histories of usage information of the plurality of communication channels by the recipient;
    selecting by a channel switch, a communication channel from the plurality of communication channels according to at least one of the usage patterns associated with the at least prior activities of the recipient including the histories of usage information retrieved from the database, a business scenario, and configuration settings, in order to reach the recipient in view of current activities of the recipient, wherein the channel switch is implemented in at least one processor configured to provide one of an enterprise information system and an enterprise resource planning system; and updating the usage patterns in the database according to the selection, the updated usage patterns including information of the current activities.

20. The method of claim 19, further comprising:

determining a set of available communication channels from the plurality of communication channels, wherein the communication channel belongs to the set of available communication channels.

21. The method of claim 19, further comprising:

collecting the usage patterns associated with the recipient from the at least two communication systems; and querying information about the current activities of the recipient from one of an enterprise information system and an enterprise resource planning system having information regarding a relationship with the recipient.

22. A system, comprising:

a usage pattern database to maintain usage patterns of a plurality of communication channels associated with a recipient, the plurality of communication channels being associated with at least two communication systems, and the usage patterns being associated with at least prior activities of the recipient, the prior activities including histories of usage information of the plurality of communication channels by the recipient; and a channel selector module to select a communication channel from the plurality of communication channels according to at least one of the usage patterns associated with the at least prior activities of the recipient including the histories of usage information retrieved from the usage pattern database, a business scenario, and configuration settings, in order to reach the recipient in view of current activities of the recipient, wherein the channel selector module is implemented in one of an enterprise information system and an enterprise resource planning system;

wherein the usage patterns in the database are updated according to the selection, the updated usage patterns including information of the current activities.

23. The system of claim 22, wherein the channel selector module detects a status of each of the plurality of communication channels, the status indicating an available communication channel.

24. The system of claim 22, wherein the channel selector module comprises:

scenario detector module to determine the current activities of the recipient based on a schedule associated with the recipient from an enterprise information system of an organization having a relationship with the recipient.

\* \* \* \* \*